United States Patent [19]

Schreiber

[11] Patent Number: 4,668,718

[45] Date of Patent: May 26, 1987

[54] SELF-EXTINGUISHING, TRACK-RESISTANT EPOXY RESIN MOULDING COMPOSITION AND USE THEREOF

[75] Inventor: Bruno Schreiber, Aesch, Switzerland

[73] Assignee: Ciba-Geigy Corporation, Ardsley, N.Y.

[21] Appl. No.: 780,160

[22] Filed: Sep. 26, 1985

[30] Foreign Application Priority Data

Oct. 5, 1984 [CH] Switzerland .......................... 4797/84

[51] Int. Cl.[4] .............................................. C08K 3/32
[52] U.S. Cl. ...................... 523/451; 523/457
[58] Field of Search ............... 523/451, 457; 524/417, 524/437

[56] References Cited

U.S. PATENT DOCUMENTS

| | | | |
|---|---|---|---|
| 3,339,013 | 8/1967 | Gainer et al. ......................... | 523/457 |
| 3,563,939 | 2/1971 | Stevens et al. . | |
| 3,677,999 | 7/1972 | Denk et al. .......................... | 523/457 |
| 4,219,607 | 8/1980 | Cammack, II et al. ............. | 523/451 |
| 4,223,071 | 9/1980 | Boyer et al. ......................... | 428/411 |
| 4,246,162 | 1/1981 | Schreiber .............................. | 523/466 |
| 4,456,723 | 6/1984 | Breitenfellner et al. ............. | 524/415 |

FOREIGN PATENT DOCUMENTS 3239872 5/1984 Fed. Rep. of Germany .
2068347 8/1981 United Kingdom .

*Primary Examiner*—Veronica P. Hoke
*Attorney, Agent, or Firm*—Luther A. R. Hall

[57] ABSTRACT

The invention relates to epoxy resin moulding compositions containing
(a) at least one epoxy resin adduct of a low molecular diglycidyl ether of a bisphenol and an aromatic or cycloaliphatic diamine that contains not less than 2.0 epoxide equivalents/kg of resin,
(b) at least one aromatic polyol containing more than 5 hydroxyl equivalents/kg of polyol as hardener, the amount of said hardener being such that the content of hydroxyl groups is 0.5 to 0.8 per epoxy group,
(c) at least one curing accelerator,
(d) up to 70% by weight of aluminium hydroxide and
(e) 1–20% by weight of a calcium phosphate, the amount of components (d) and (e) together being not more than 85% by weight and the percentages by weight being based on the total weight of the epoxy resin moulding composition.

These moulding compositions are self-extinguishing and have good tracking resistance. They are suitable e.g. for making electrical components.

16 Claims, No Drawings

SELF-EXTINGUISHING, TRACK-RESISTANT EPOXY RESIN MOULDING COMPOSITION AND USE THEREOF

The present invention relates to self-extinguishing, track-resistant epoxy resin moulding compositions and to the use thereof for the production of moulded articles by curing.

Epoxy resin moulding compositions with improved resistance to cracking and comprising an epoxy resin adduct, a curing accelerator, a filler and an aromatic polyol as hardener are disclosed in European patent specification No. 12714. At least two-thirds of the filler preferably consist of wollastonite.

Track-resistant moulding compositions based on thermoplastic polymers, especially polyesters, and containing substantially anhydrous calcium phosphate are disclosed in European patent application No. 078 238 A 1. To impart flame-retardant properties, conventional halogen-containing flame retardants such as decabromodiphenyl oxide or polytribromostyrene, preferably in conjunction with antimony trioxide, are added to these moulding compositions.

The present invention relates to novel epoxy resin moulding compositions containing (a) at least one epoxy resin adduct of a low molecular diglycidyl ether of a bisphenol and an aromatic or cycloaliphatic diamine that contains not less than 2.0 epoxide equivalents/kg of resin, (b) at least one aromatic polyol containing more than 5 hydroxyl equivalents/kg of polyol as hardener, the amount of said hardener being such that the content of hydroxyl groups is 0.5 to 0.8 per epoxy group, (c) at least one curing accelerator, (d) up to 70% by weight of aluminium hydroxide, and (e) 1–20% by weight, preferably 2–20% by weight, of a calcium phosphate, the amount of components (d) and (e) together being not more than 85% by weight and the percentages by weight being based on the total weight of the epoxy resin moulding composition.

Although hardeners based on aromatic polyols are in general not entirely satisfactory as regards the tracking resistance of the systems cured therewith, it has surprisingly been found that self-extinguishing, track-resistant moulding compositions and cured products are obtained according to this invention without the addition of environmentally harmful or toxic fillers such as phosphorus, organophosphorus compounds, organic halogen-containing flame retardants and/or antimony trioxide. From the point of view of industrial hygiene, this constitutes a substantial advantage. The moulding compositions of this invention can furthermore be readily processed, in particular by injection moulding, and they have good thermal and mechanical properties such as good dimensional stability, good flexural strength and good notched impact strength. They also have little tendency to coat the moulds and the mouldings can be easily removed therefrom.

The epoxy resin adducts (a) are preferably solid and have a melting point of at least 60° C. If desired, up to 50% of the epoxy resin adduct (a) can also be replaced by other epoxy resins that are solid at room temperature.

The hardener (b) preferably has a melting point of at least 60° C. and is added to the moulding composition in an amount such that the content of hydroxyl groups is 0.6 to 0.8 per epoxy group. The aromatic polyol employed as hardener (b) is preferably a polyol derived from a phenol.

A preferred group of hardeners (b) comprises the novolaks, in particular the reaction products, obtained in acid medium, of phenol, chlorophenol or alkylphenols containing up to 9 carbon atoms in the alkyl moiety with aldehydes such as acetaldehyde and, preferably, formaldehyde. Particularly preferred novolaks are phenol, resorcinol, cresol and xylenol novolaks or mixtures thereof.

Another group of polyol hardeners (b) comprises polyhydroxybenzenes or (monomeric or polymeric) hydroxyphenylated hydrocarbons, the hydrocarbon moiety of which may contain e.g. 2 to 10, preferably 2 to 4, carbon atoms. Examples of preferred compounds of this kind are 1,1,2,2-tetrakis(hydroxyphenyl)ethane, 1,1,3-tris(hydroxyphenyl)propane and 1,2,3-, 1,2,4- or 1,3,5-trihydroxybenzene.

It is often convenient to mix the novolaks employed as hardener with other aromatic or aliphatic polyols, for example with aromatic diols such as bisphenol A or resorcinol.

The epoxy resin adducts (a), which preferably have a melting point of at least 60° C. and an epoxy group content of at least 2.5 equivalents/kg of resin, are known resins which are disclosed e.g. in U.S. Pat. Nos. 3,409,591, 3,454,421, 3,553,985, 3,963,666 and 3,996,175. Suitable diglycidyl ethers of bisphenols are, for example, the diglycidyl ethers of bis(4-hydroxyphenyl)methane (bisphenol F), 2,2-bis(4-hydroxyphenyl)propane (bisphenol A), 2,2-bis(4-hydroxy-3,5-dibromophenyl)propane (tetrabromobisphenol A), 1,1,2,2-tetrakis(4-hydroxyphenyl)ethane, 4,4'-dihydroxybiphenyl and bis(4-hydroxyphenyl)sulfone. The low molecular diglycidyl ethers of bisphenol F and, in particular of bisphenol A, are preferred.

The epoxy resin adducts (a) are conveniently prepared by starting from low molecular liquid to semi-liquid diglycidyl ethers of bisphenols, in particular from the diglycidyl ether of bisphenol A, which ethers preferably contain more than 4.5 epoxide equivalents/kg of resin. They are converted into a solid, but still reactive, form by chain advancement with an aromatic or cycloaliphatic diamine. Suitable aromatic or cycloaliphatic diamines are cited in the patent specifications referred to above. These diamines may be purely aromatic or purely cycloaliphatic or mixed aliphatic-aromatic or aliphatic-cycloaliphatic diamines. Typical examples are: diaminocycloalkanes and diaminodicyclohexylalkanes such as 3-aminomethyl-3,5,5-trimethylcyclohexylamine(isophoronediamine), 4,4'-diaminodicyclohexylmethane, 1,3- and 1,4-diaminocyclohexane and 4,4'-diamino-3,3'-dimethyldicyclohexylmethane; diaminodiphenylalkanes, diaminodiphenylalkylidenes, diaminodiphenyl ethers, diaminodiphenylthioethers or diaminodiphenylsulfones, for example 4,4'-diaminodiphenylmethane, 2,2-bis(4-aminophenyl)propane, 4,4'-diaminodiphenyl ether, 4,4'-diaminodiphenyl thioether or diaminodiphenylsulfone, 4,4'-diamino-3,3'-dichlorodiphenylmethane; m-, o- or p-phenylenediamine, 4,5-dimethyl-1,2-phenylenediamine, 2,4-, 2,6- or 3,4-diaminotoluene; phenyl-substituted alkylenediamines such as 1,2-diamino-1,2-diphenylethane. Preferred diamines are 4,4'-diaminodiphenylmethane and isophoronediamine.

For modifying and obtaining desired properties it is possible to replace up to 50% of the epoxy resin adduct (a) by one or more epoxy resins which are solid at room temperature. Examples of such epoxy resins are: polyglycidyl ethers of novolaks and bisphenols, N-glycidyl compounds such as triglycidyl isocyanurate, glycidyl hydantoins and polyglycidyl esters.

The curing accelerators (c) are generally employed in amounts of 0.1 to 5% by weight, preferably of 0.1 to 2% by weight, based on the total weight of the moulding composition. Suitable accelerators are any compounds that are able to speed up the curing reaction. Examples of such compounds are: imidazole and imidazole derivatives as well as salts of imidazoles with polycarboxylic acids or polycarboxylic acid anhydrides such as imidazole, 1-methylimidazole, 2-ethylimidazole, 2-methyl-4-ethylimidazole, 2-phenylimidazole, benztriazole, $BF_3$- or $BCl_3$-amine complexes, alkylammonium halides (e.g. the chlorides and bromides) such as tetramethylammonium chloride or tetrabutylammonium bromide, ureas and derivatives thereof, e.g. N-p-chlorophenyl-N,N'-dimethylurea. Preferred accelerators are unsubstituted imidazole and imidazole derivatives such as 2-ethylimidazole.

The aluminium hydroxide (d) [aluminium oxide trihydrate, $Al_2O_3.3H_2O$ or $Al(OH)_3$)] is preferably added in an amount of 20-50% by weight, based on the total weight of the moulding composition.

The calcium phosphates (e) are preferably finely particulate and substantially anhydrous calcium phosphates. The phosphates should therefore be dried, if necessary, before being added to the moulding compositions. The calcium phosphates may have a particle size of e.g. 0.1 to 100 μm, preferably of 1 to 50 μm. The calcium phosphates may be calcium hydrogen phosphate, calcium phosphate, calcium hydroxide apatite, calcium halide apatite, preferably calcium fluoride or chloride apatite, a metaphosphate, a polyphosphate or an ultraphosphate, and mixtures of phosphates. Examples are: $CaHPO_4$, $Ca_3(PO_4)_2$, $Ca(PO_4)_3(OH)$, $Ca_5(PO_4)_3(F,Cl)$, $Ca_2P_2O_7$, $Ca_3(P_3O_9)_2$, $Ca_2(P_4O_{12})$, $Ca_5(P_3O_{10})_2$ and calcium polyphosphate. Preferred calcium phosphates are $CaHPO_4$, $Ca_5(PO_4)_3(OH)$ and $Ca_5(PO_4)_3(F,Cl)$ and, most preferably, $Ca_3(PO_4)_2$.

The amount of calcium phosphate (e) contained in the moulding compositions of this invention is advantageously 2-10% by weight, based on the total weight of the moulding composition.

Aside from aluminium hydroxide and calcium phosphate, especially tricalcium phosphate, the moulding compositions of this invention may contain additional fillers. Examples of suitable additional fillers are: wollastonite (naturally occurring or commercially available calcium metasilicate), synthetic fibres such as polyvinyl alcohol, polyamide and polyester fibres, glass fibres, asbestos fibres, boron fibres, carbon fibres, powdered glass, glass beads, quartz flour, powdered quartz glass (amorphous crystalline quartz flour), mica, asbestos flour, powdered slate, kaolin, calcined kaolin, dolomite, diopside, talcum, calcium carbonate, powdered chalk, gypsum, bentonite, silica aerogel (aerosil), barium sulfate, lithopones, barytes, titanium dioxide, carbon black, graphite, oxide pigments such as iron oxide, or metal powders such as aluminium or iron powder. The use of conductive fillers should be avoided for insulation purposes in electrical engineering.

In a preferred embodiment of the invention, the moulding compositions contain synthetic fibres such as polyvinyl alcohol or polyesters fibres, glass fibres and/or wollastonite as additional filler. In this case, the total amount of aluminium hydroxide (d), calcium phosphate (e) and additional filler is advantageously 50-75% by weight, based on the total weight of the moulding composition.

Before the curing, conventional modifiers can be added to the epoxy moulding compositions of this invention in any phase. Examples of such modifiers are: dyes, pigments, plasticisers, flow control agents, thixotropic agents, mould release agents, bonding agents to promote adhesion between fillers and resin and also other synthetic resins such as phenoplasts and aminoplasts. Suitable adhesion promoters are e.g. silanes.

The epoxy resin moulding compositions can be prepared in conventional manner with the aid of known mixing devices (e.g. extruders, stirrers, kneaders, rolls and mills). Thus, for example, it is possible to mix the individual components with one another intensively, optionally after they have been ground beforehand (dry method). However, mixing can also be effected in a kneader to produce a granulate. Preferably the mouldings are obtained by the melt process (in a kneader or extruder) in the temperature range from 80° to 120° C.

The solid epoxy resin moulding compositions of the invention can be processed to mouldings of all kinds by conventional methods by curing. The curing temperature is normally between 140° and 200° C., preferably between 150° and 190° C. The moulding compositions are especially suitable for processing by injection moulding with screw preplastication. The moulding compositions are used for producing high grade mouldings, in particular in the electrical engineering sector, for example for making switch, switch relay and relay components, or in the automotive industry, for example for making ignition distributors, ignition coil covers, sparking plug sockets and the like. Metal parts can also be readily encased with the moulding compositions of the invention.

The following Examples illustrate the invention in more detail.

I. STARTING MATERIALS AND PREPARATION OF THE MOULDING COMPOSITIONS

Epoxy Resin A (according to U.S. Pat. No. 3,996,175)

A 2 liter reaction vessel is charged with 1000 g of a liquid bisphenol A epoxy resin having a content of 5.35 epoxy group equivalents/kg and a viscosity at 25° C. of 13.500 mPa·s and heated in an oil bath to 140° C. Then 100 g of fused 4,4'-diaminodiphenylmethane (10.00 $NH_2$/kg) is blended in at 100° C. over 45 minutes. The rate of addition is such that the temperature of the reaction mixture does not exceed 150° C. After heating for a further 30 minutes at the same temperature, the resultant viscous liquid is cooled and the light yellow, resinous and brittle product is ground. Properties of the product:
epoxy group content/kg=3.00 equivalents/kg
melting point (Kofler bench)=72° C.

Epoxy resin B

A 2 liter reaction vessel is charged with 1000 g of the same bisphenol A epoxy resin as in A) and the contents are heated on an oil bath to 120° C. Then 87.5 g of 3-aminomethyl-3,5,5-trimethylcyclohexylamine(isophoronediamine) are slowly added from a drip funnel over 45 minutes. The rate of addition is controlled such that the temperature of the reaction mixture does not exceed 140° C. Meanwhile the temperature of the bath is gradually raised to 140° C. The resultant product is kept for a further 30 minutes at 140° C., then cooled and ground.

Epoxide content = 2.9 equivalents/kg
Melting point (Kofler bench) = 70° C.

Epoxy resin C

A 2 liter reaction vessel is charged with 1000 g of a liquid bisphenol F epoxy resin with a content of 6.00 epoxide equivalents/kg and a viscosity at 25° C. of 6500 mPa·s, and the contents of the reactor are heated on an oil bath to 140° C. Then 110 g of 4,4'-diaminodiphenylmethane (10.00 $NH_2$/kg) are added over 60 minutes in 10 equal portions and blended with the hot resin. The rate of addition is controlled such that the temperature does not exceed 150° C. After heating for another 30 minutes, the resultant viscous liquid is cooled and the resinous and brittle product is ground. The product has the following properties:

epoxide content = 3.10 equivalents/kg
melting point (Kofler bench) = 67° C.

Curing agent A

Solid cresol novolak containing 8.5 hydroxyl equivalents/kg and with a melting point (Kofler bench) of 90° C.

Curing agent B 1,1,2,2-tetrakis(hydroxyphenyl)ethane containing 7.7 hydroxyl equivalents/kg and with a melting point of 112° C. (Kofler bench).

Accelerator 2-ethylimidazole.

Preparation of the moulding compositions

Moulding compositions 1, 4 and 6: The components indicated in the following Table are weighed into a 5 liter laboratory ball mill in a total amount of 1 kg and ground for 15 hours. The resultant powder is compressed to tablets, heated to ca. 80° C. by high frequency and processed to mouldings in hot steel moulds of 170° C. The curing time is 10 minutes for the 10 mm test samples (DIN bars measuring 120×15×10 mm) and 4 minutes for the samples having a thickness of up to 4 mm.

Moulding composition 2: The components indicated in the Table, except for the glass fibres, are weighed in a total amount of 3 kg into a water-cooled impeller mixer and homogenised for 30 seconds at a speed of 1400 rpm. This premix, together with chopped glass fibres (length: 4.5 mm), is put into a laboratory kneader using a weighing scales, and fused at 100° C. and kneaded. The melt is cooled and ground to granules. The granules are processed as described for moulding compositions 1, 4 and 6.

Moulding composition 3: The components indicated in the Table, without the ground polyester fibres, are weighed into a 5 liter laboratory ball mill in a total amount of 950 g and ground for 14 hours. Then the polyesters fibres are added and grinding is continued for another hour. The resultant powder is compressed in a two-roll mill and granulated. The test samples are prepared as described for moulding compositions 1, 4 and 6.

Moulding composition 5: The components indicated in the Table are ground in a total amount of 1 kg in a 5 liter laboratory ball mill and subsequently kneaded for 3 minutes at 80° C. in a two-roll calander. The resultant product is cooled, ground and compressed to mouldings as described above.

II. PERFORMANCE TESTS

The combustibility is determined in accordance with the UL 94 Standard, first edition of 1972 (Underwriters Laboratories), using test samples having a thickness of 1.6 mm.

The tracking resistance is determined in accordance with DIN 53 480 (October 1976). Round test samples having a thickness of 3 mm and a diameter of 80 mm are used. Parallel measurements are made by the KA and KB methods for better differentiation (DIN = Deutsche Industrie-Norm).

The flexural strength is determined in accordance with ISO 178 at room temperature using test samples measuring 80×10×4 mm (ISO = International Standards Organisaion).

The notched impact strength is determined in accordance with DIN 53 453 using test samples measuring 120×5×10 mm.

Processing behaviour in injection moulding with screw preplastication

The object of this test consists in causing the moulding compositions, under unfavourable conditions (high cylinder and nozzle temperatures, lengthy cycle times), to form a cured layer in the nozzle cone and thus subsequently to block the machine. The different results obtained make it possible to assess and rate the moulding compositions. The number of cycles is counted and the thickness of the layer formed on the moulding composition is measured with a metering clockwork (accuracy: 0.01 mm).

Operating conditions: screw injection moulding machine Rover 160 BT (made by Bühler AG, Uzwil, Switzerland);

nozzle temperature: 80° C., cylinder temperature: 60° C.,
speed of the screw: 100 rpm
dynamic pressure: 20 bar.

The evaluation is made in accordance with the following scale:

| Rating | Layer thickness (mm) | No. of cycles |
|---|---|---|
| 1 | 0 | 60 |
| 2 | 0.1 to 0.5 | 60 |
| 3 | 0.5 | 15-60 |
| 4 | 0.5 | below 15 |

Rating 1 means that the moulding composition has absolutely no propensity to form a layer in the nozzle cone. Rating 2 means that a 0.5 mm layer may form after 60 cycles. Rating 3 means that a 0.5 mm layer forms after 15 to 60 cycles. Finally, rating 4 means that a 0.5 mm layer forms in less than 15 cycles. Moulding compositions with a rating of 4 are unsuitable for the described method of processing. This test is specific to epoxy resin moulding compositions.

TABLE

| Moulding composition | | 1 | 2 | 3 | 4 | 5 | 6 |
|---|---|---|---|---|---|---|---|
| epoxy resin A | % by weight | 21.7 | — | 21.7 | — | 21.7 | — |
| epoxy resin B | " | — | 21.6 | — | 18.2 | — | — |
| epoxy resin C | " | — | — | — | — | — | 21.6 |
| curing agent A | " | 5.5 | 5.6 | 5.55 | — | 5.5 | 5.65 |
| curing agent B | " | — | — | — | 5.4 | — | — |
| 2-ethylimidazole (accelerator) | " | 0.2 | 0.2 | 0.15 | 0.2 | 0.2 | 0.15 |
| natural wollastonite | " | 31.3 | 31.3 | 16.3 | 29.9 | 31.3 | — |
| aluminium hydroxide | " | 35.0 | 35.0 | 35.0 | 35.0 | 35.0 | 47.30 |
| tricalcium phosphate | " | 5.0 | 5.0 | 5.0 | 5.0 | 5.0 | 4.00 |
| glass fibres 4.5 mm | " | — | — | 15.0 | — | — | 20.00 |
| polyester fibres (poly(1,4-butyleneterephthalate) | " | — | — | — | 5.0 | — | — |
| OP-wax (mould release agent, a product of Hoechst) | " | 1.0 | 1.0 | 1.0 | 1.0 | 1.0 | 1.00 |
| Carbon black (% by weight) | | 0.3 | 0.3 | 0.3 | 0.3 | 0.3 | 0.3 |
| combustibility UL 94, 1.6 mm, step | | V-O | V-O | V-O | V-O | V-O | V-O |
| tracking resistance according to DIN 53480 | | | | | | | |
| KB method, volt | | >600 | >600 | >600 | >600 | >600 | >600 |
| KA method, step | | KA3c | KA3c | KA3c | KA3c | KA3c | KA3c |
| injection moulding test, step | | 1 | 1 | 1 | 2 | 1 | 1 |
| notched impact strength according to DIN 53453 kJ/m$^2$ | | 1.8 | 1.9 | 5.0 | 4.0 | 1.9 | 4.2 |
| flexural strength according to ISO 178 N/mm$^2$ | | 80.0 | 83.0 | 125.0 | 78.0 | 85.0 | 138.0 |

It is evident from the above data that the moulding compositions of this invention have a high degree of non-combustibility, good processing behaviour, good tracking resistance and good notched impact strength and flexural strength. Good notched impact strength is achieved in particular by adding reinforcing fillers.

What is claimed is:

1. An epoxy resin moulding composition containing
   (a) at least one epoxy resin adduct of a low molecular diglycidyl ether of a bisphenol and an aromatic or cycloaliphatic diamine that contains not less than 2.0 epoxide equivalents/kg of resin,
   (b) at least one aromatic polyol containing more than 5 hydroxyl equivalents/kg of polyol as hardener, the amount of said hardener being such that the content of hydroxyl groups is 0.5 to 0.8 per epoxy group,
   (c) at least one curing accelerator,
   (d) up to 70% by weight of aluminium hydroxide, and
   (e) 1–20% by weight of a calcium phosphate, the amount of components (d) and (e) together being not more than 85% by weight and the percentages by weight being based on the total weight of the epoxy resin moulding composition.

2. A moulding composition according to claim 1, wherein the aromatic polyol is a novolak.

3. A moulding composition according to claim 2, wherein the novolak is a phenol, resorcinol, cresol or xylenol novolak or a mixture of said novolaks.

4. A moulding composition according to claim 1, wherein the aromatic polyol is a polyhydroxybenzene or a hydroxyphenylated hydrocarbon of 2 to 10 carbon atoms.

5. A moulding composition according to claim 4, wherein the aromatic polyol is 1,1,2,2-tetrakis(hydroxyphenyl)ethane, 1,1,3-tris(hydroxyphenyl)propane, 1,2,3-, 1,2,4- or 1,3,5-trihydroxybenzene.

6. A moulding composition according to claim 1, wherein the curing agent (b) is used in an amount such that the content of hydroxyl groups is 0.6 to 0.8 per epoxy group.

7. A moulding composition according to claim 1, wherein component (a) has a melting point of at least 60° C. and an epoxy group content of at least 2.5 equivalents per kg of resin.

8. A moulding composition according to claim 1, wherein component (a) is an adduct of a low molecular diglycidyl ether of bisphenol A and 4,4'-diaminodiphenylmethane or isophoronediamine.

9. A moulding composition according to claim 1, which contains the curing accelerator (c) in an amount of 0.1 to 5% by weight, based on the total weight of said moulding composition.

10. A moulding composition according to claim 1, wherein the curing accelerator (c) is an unsubstituted imidazole or an imidazole derivative.

11. A moulding composition according to claim 1, which contains the aluminium hydroxide (e) in an amount of 20–50% by weight, based on the total weight of said moulding composition.

12. A moulding composition according to claim 1, wherein the calcium phosphate (e) is a finely particulate and substantially anhydrous calcium phosphate.

13. A moulding composition according to claim 1, wherein the calcium phosphate (e) is tricalcium phosphate.

14. A moulding composition according to claim 1, which contains the calcium phosphate (e) in an amount of 2–10% by weight, based on the total weight of said moulding composition.

15. A moulding composition according to claim 1, which contains synthetic fibres, glass fibres and/or wollastonite as additional fillers, the amount of aluminium hydroxide (d), calcium phosphate (e) and additional filler being 50–75% by weight, based on the total weight of said moulding composition.

16. A process for the preparation of moulded articles by curing epoxy resin moulding compositions as claimed in claim 1.

* * * * *